United States Patent
DiSalvo et al.

(10) Patent No.: US 7,639,461 B2
(45) Date of Patent: Dec. 29, 2009

(54) OVERCURRENT PROTECTION FOR CIRCUIT INTERRUPTING DEVICES

(75) Inventors: Nicholas L. DiSalvo, Levittown, NY (US); Steve Campolo, Malverne, NY (US)

(73) Assignee: Leviton Manufacturing Company, Inc., Little Neck, NY (US)

( * ) Notice: Subject to any disclaimer, the term of this patent is extended or adjusted under 35 U.S.C. 154(b) by 230 days.

(21) Appl. No.: 11/109,628

(22) Filed: Apr. 20, 2005

(65) Prior Publication Data

US 2006/0002043 A1    Jan. 5, 2006

Related U.S. Application Data

(60) Provisional application No. 60/566,826, filed on Apr. 30, 2004.

(51) Int. Cl.
*H02H 3/16* (2006.01)
(52) U.S. Cl. .......................................... 361/42; 361/44
(58) Field of Classification Search .............. 361/42–50
See application file for complete search history.

(56) References Cited

U.S. PATENT DOCUMENTS

| | | | | |
|---|---|---|---|---|
| 5,185,686 A | * | 2/1993 | Hansen et al. | 361/45 |
| 5,642,248 A | | 6/1997 | Rosenbaum et al. | |
| 5,844,759 A | * | 12/1998 | Hirsh et al. | 361/42 |
| 6,831,819 B2 | * | 12/2004 | Nemir et al. | 361/42 |
| 7,099,130 B2 | * | 8/2006 | Angle et al. | 361/44 |
| 2005/0280961 A1 | | 12/2005 | Campolo | |

* cited by examiner

*Primary Examiner*—Danny Nguyen
(74) *Attorney, Agent, or Firm*—Collard & Roe, P.C.

(57) ABSTRACT

The present invention is directed to current interrupting devices with overcurrent protection. In one embodiment, a ground fault circuit interrupter (GFCI) is disclosed having both ground fault and overcurrent protection. The GFCI has a current detection circuit that includes a switch connected across the load phase terminal and the line neutral terminal of the device. A comparator compares a predefined threshold voltage to a sensed voltage based on a current through the line and load neutral terminals of the device. If the sensed voltage exceeds the predefined threshold, the comparator causes the switch to conduct thereby tripping the device, disconnecting the load from the line terminals and preventing the overcurrent condition from causing damage to the device and/or load.

21 Claims, 7 Drawing Sheets

OVERCURRENT PROTECTION FOR CIRCUIT INTERRUPTING DEVICES

This application claims priority of U.S. provisional application Ser. No. 60/566,826, filed Apr. 30, 2004.

BACKGROUND OF THE INVENTION

1. Field of the Invention

The present invention generally relates to overcurrent protection for circuit interrupting devices.

2. Description of the Related Art

Circuit interrupting devices are typically designed to safely provide electrical power to an electrical circuit or system to which such devices are electrically coupled. A circuit interrupting device has line terminals that are connected to a power source and load terminals that are connected to one or more electrical devices or systems. The electrical devices and systems are commonly referred to as loads. The line terminals usually comprise a line phase terminal (Lø) and a line neutral terminal (LN). Similarly, the load terminals usually comprise a load phase terminal (LDø) and a load neutral terminal (LDN).

During operation, a circuit interrupting device provides a conductive path through which electrical current is routed from the line phase terminal to the load phase terminal and to the load. The circuit interrupting device provides a return path for the current whereby the current is routed from the load to the load neutral terminal and back to the power source via the line neutral terminal. The line neutral terminal is usually connected to a reference point commonly referred to as system ground. The circuit interrupting device is triggered when a current imbalance exists; that is, when the current into the circuit interrupting device (i.e., current through the line phase terminal) is different in magnitude than the current exiting the device (i.e., current through the line neutral terminal). The cause of such a current imbalance is typically due to leakage current at the load or leakage current somewhere along the return path of the current from the load. In other words, some of the current flowing into the load is routed to some path (i.e., leakage path) other than the return path. The leakage path can be located at the load or somewhere along the return path.

Figure 1:
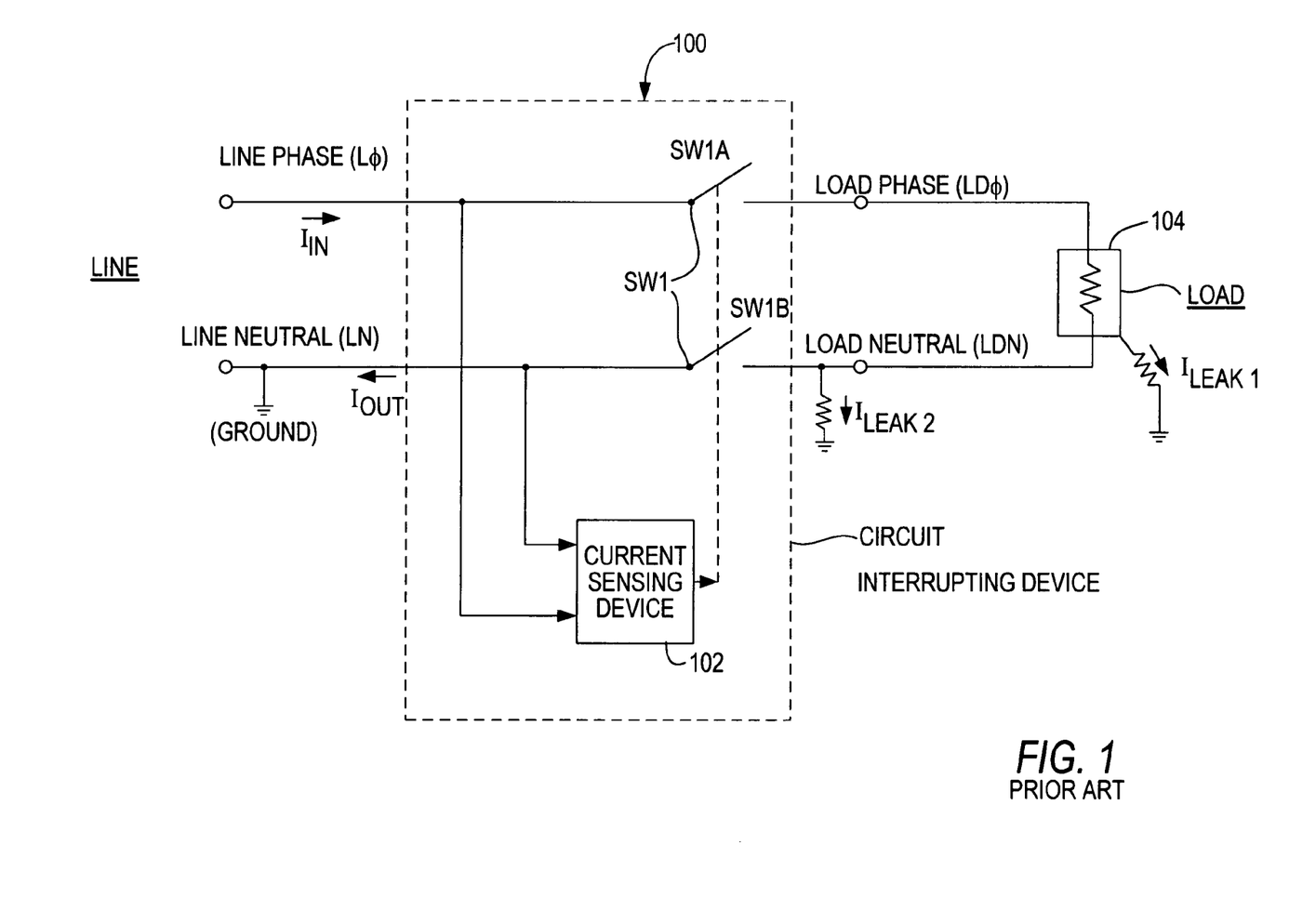
FIG. 1 is a block diagram of a prior art circuit interrupting device.

Referring to FIG. 1, there is shown a circuit interrupting device 100 having a current sensing device 102 and a switch SW1 comprising switches SW1A and SW1B. When $I_{IN}$ (input current) is substantially equal to $I_{OUT}$ (output current), the switches are closed by current sensing device 102 allowing current to flow from a power source (not shown) to circuit interrupting device 100 and onto a load 104. There are two examples of current leakages shown. As stated above, current leakage at load 104 occurs when some of the current flowing into the load returns to earth ground through an alternate path. In actual cases, the alternate path may be thru a person in which case the flow of current must be stopped as quickly as possible in order to avoid serious injury or even death to such a person. The current leakage at the load is shown as $I_{LEAK1}$. Current leakage along the return path is shown as $I_{LEAK2}$. Although not shown, there can be leakage current before the load.

When current sensing device 102 detects a current imbalance whereby $I_{IN} \ne I_{OUT}$, it causes switches SW1A and SW1B to open thereby terminating the flow of current at the load phase and load neutral terminal. Current sensing device 102 can be designed to detect relatively small differences between the input and output currents. Current interrupting device 100, once triggered, can be reset and once again be in a state to detect current imbalances. The resetting of circuit interrupting device 100 is usually with a pushbutton switch readily accessible to a user of such a device.

Although current interrupting devices are designed to detect current imbalances, they are not designed to detect overcurrent situations. Overcurrent situations are scenarios where a device is drawing a relatively large amount of current that can cause permanent or serious damage to such device. For example, an electrical short within a load connected to the circuit interrupting device can cause a relatively large amount of current to flow through the load and also through the circuit interrupting device to which the load is connected. The large current surge not only can damage the load, but can also damage the circuit interrupting device. Typically, the load is provided with a fuse rated at a certain current value such that when the current through the load attempts to surpass the rated current value, the fuse is permanently disabled (e.g., fuse filament is burnt) preventing any further current flow from the source to the load.

The current interrupting device may or may not have a fuse. If the circuit interrupting device is designed with a fuse, the current rating of such a fuse may not match the current rating of the load. For example, if the current rating of the load is more than the current rating of the current interrupting device, the fuse of the current interrupting device may be blown for current which are acceptable to the load; this situation will cause an inefficient operation of the device. Notwithstanding the current rating mismatch between the load and the current interrupting device, whenever a fuse is permanently damaged, there may be required some physical disassembly of the load device and/or the circuit interrupting device.

Currently, the approaches to resolving overcurrent situations are inadequate and burdensome. A circuit interrupting device which can protect itself and the load from overcurrent situations is desirable. Furthermore, standards bodies and organizations such as Underwriters Laboratories (UL) are leaning towards requiring that circuit interrupting devices be designed with overcurrent protection.

SUMMARY OF THE INVENTION

The present invention helps overcome the problems in the prior art by providing current interrupting devices with overcurrent protection. In one embodiment, a ground fault circuit interrupter (GFCI) is disclosed having both ground fault and overcurrent protection. The GFCI device provides overcurrent protection by using a current detection circuit that has a switch connected across the load phase terminal and the line neutral terminal of the device. A comparator compares a predefined threshold voltage to a sensed voltage based on a current through the line and load neutral terminals of the device. If the sensed voltage exceeds the predefined threshold, the comparator causes the switch to conduct thereby tripping the GFCI device and preventing the overcurrent condition from causing damage to the device and/or load. Thus, the present invention provides a current interrupting device capable of both detecting current imbalances (ground fault) and overcurrent situations and disconnecting power source from the load in response thereto. The present invention has application in other circuit interrupting devices such as arc fault circuit interrupters (AFCIs), immersion detection circuit interrupters (IDCIs) and other devices. For example, in another embodiment of the present invention, an IDCI device is provided which includes both immersion and overcurrent protection. The devices of the present invention also help meet overcurrent protection requirements of circuit interrupting devices set forth by standards bodies and organizations such as Underwriters Laboratories (UL).

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features and advantages of the present invention will become more fully apparent from the following detailed description, the appended claim, and the accompanying drawings in which similar elements are given similar reference numerals:

DETAILED DESCRIPTION OF THE INVENTION

The present invention is directed to current interrupting devices with overcurrent protection. In one embodiment, a ground fault circuit interrupter (GFCI) is disclosed having both ground fault and overcurrent protection. The GFCI device provides overcurrent protection by using a current detection circuit that includes a switch connected across the load phase terminal and the line neutral terminal of the device. A comparator compares a predefined threshold voltage to a sensed voltage based on a current through the line and load neutral terminals of the device. If the sensed voltage exceeds the predefined threshold, the comparator causes the switch to conduct thereby tripping the device and preventing the overcurrent condition from causing damage to the device and/or load. Thus, the present invention provides a GFCI device having both ground fault protection and overcurrent protection. The present invention has application to other circuit interrupting devices such as arc fault circuit interrupters (AFCIs), immersion detection circuit interrupters (IDCIs) and other devices. For example, in another embodiment of the present invention, an IDCI device is provided which includes both immersion and overcurrent protection.

Figure 2:
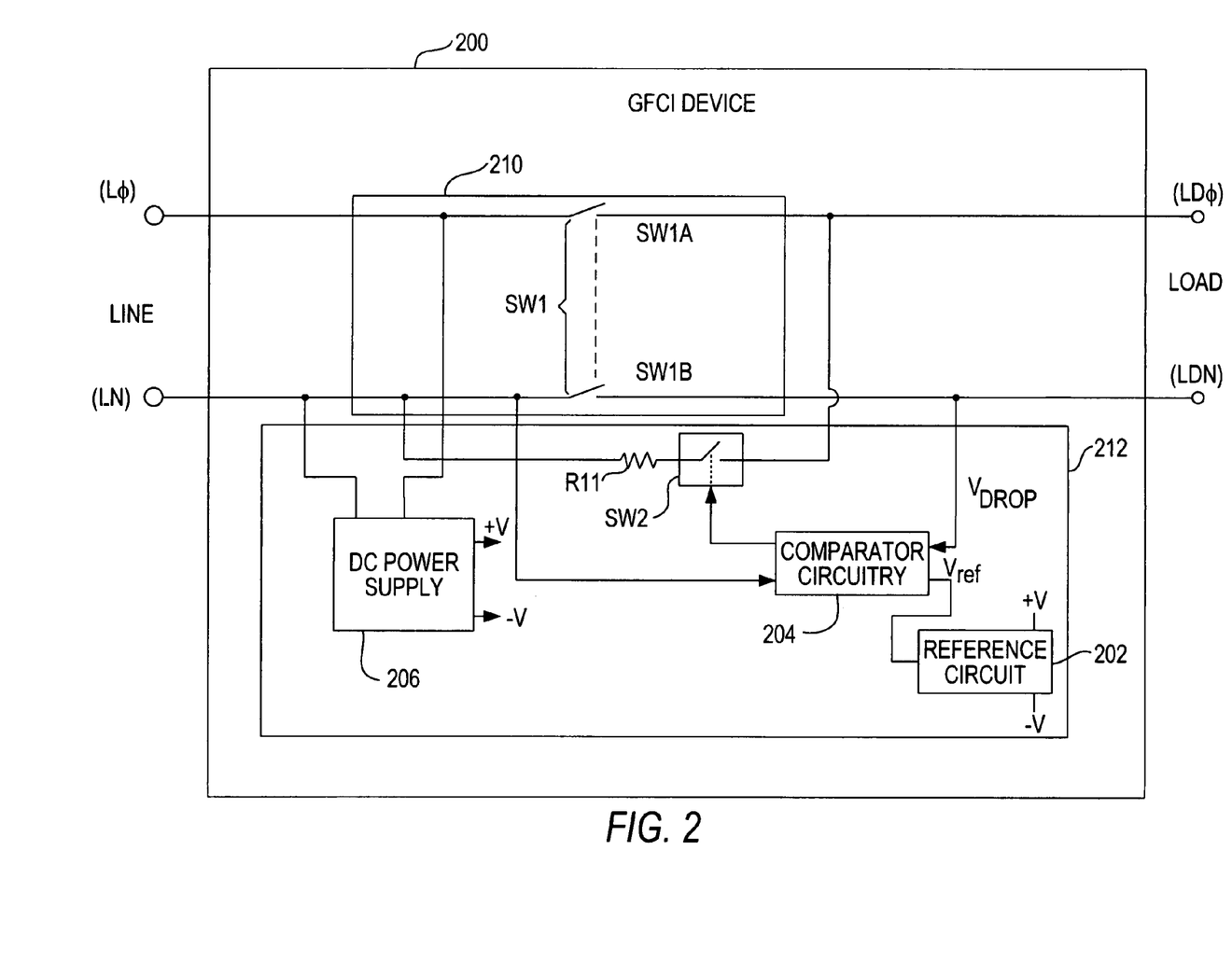
FIG. 2 is a block diagram of a ground fault circuit interrupter (GFCI) device with a GFCI circuit and a current detection circuit for providing overcurrent protection, according to an embodiment of the present invention.

FIG. 2 is a block diagram of a GFCI device 200 that includes a GFCI circuit 210 for providing ground fault protection and a current detection circuit 212 for providing overcurrent protection. The GFCI circuit 210 includes a switching element SW1 comprising a first switch SW1A to provide a conductive path between the line side phase terminal Lø and the load side phase terminal LDø of the device and a second switch SW1B to provide a conductive path between the line side neutral terminal LN and the load side neutral terminal LDN of the device. When the GFCI circuit 210 detects a fault condition, such as a ground fault condition, it causes the switch SW1 to break the conductive path thereby disconnecting the load side from the line side and placing the device in the tripped state.

The current detection circuit 212 includes a switch SW2 coupled across the load phase terminal LDø and the line neutral terminal LN. A current limiting resistor R11 is coupled between the switch SW2 and the line neutral terminal LN to limit the current flow through the switch when it conducts. A comparator circuit 204 compares a predefined reference voltage Vref from reference circuit 202 to a voltage Vdrop. The voltage Vdrop is developed by a current flowing through the load neutral terminal LDN and line neutral terminal LN and the resistance inherent in these terminals. A direct current (DC) power supply 206 is connected across line neutral terminal LN and the line side phase terminal Lø. The power supply 206 provides a positive DC output voltage (+V) and a negative DC output voltage (−V) used by reference circuit 202 to derive predefined reference voltage Vref. The supply voltages are referenced to the line neutral terminal LN.

In operation, under normal conditions (non-overcurrent and non-fault condition), switch SW2 is open and switches SW1A, SW1B are closed providing a conductive path between line and load terminals. In a fault condition, the GFCI circuit 210 detects the fault condition and opens the switches SW1A, SW1B thereby breaking the conductive path between the line and load terminals. In an overcurrent condition, current flows through the load neutral terminal LDN and line neutral terminal LN. The current flow causes a voltage Vdrop to be developed across the resistance of line terminals LDN, LN. If the voltage Vdrop exceeds voltage Vref, the comparator 204 generates an output signal causing switch SW2 to conduct (close). The conduction of switch SW2 simulates a ground fault condition which is detected by GFCI circuit 210. The ground fault condition causes the GFCI circuit 210 to open the switches SW1A, SW1B thereby disconnecting the line from the load.

Thus, GFCI device 200 detects an overcurrent condition and causes the removal of power from load phase terminal LDø and load neutral terminal LDN. In addition to providing overcurrent protection, the GFCI device 200 of the present invention provides ground fault protection (current imbalance). The present invention is described in the context of a GFCI device, however, the techniques of the present invention are equally applicable to other circuit interrupting devices such as AFCI devices.

Figure 3A:
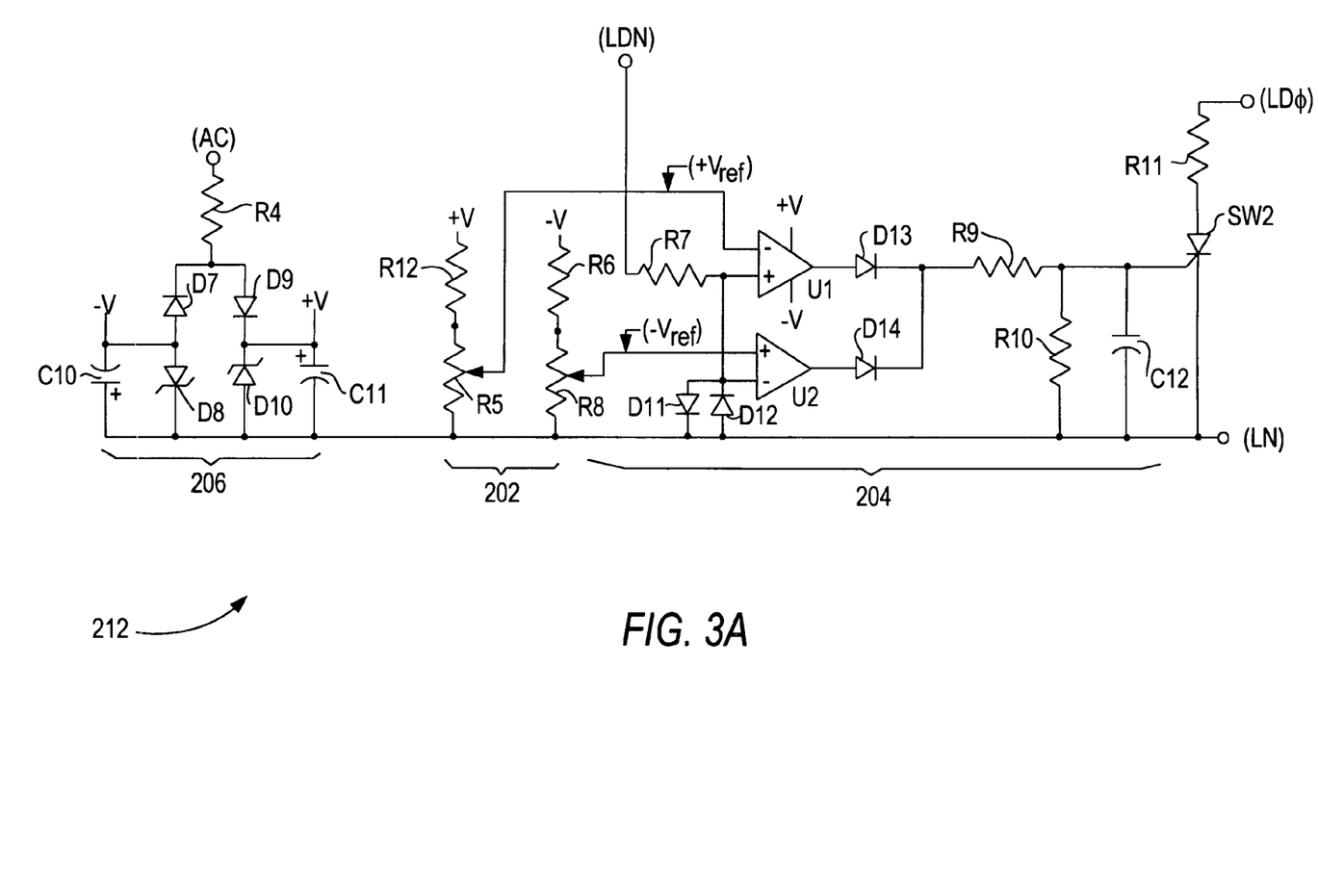
FIGS. 3A, 3B are schematic diagrams, which when placed together, represent a schematic diagram of FIG. 2.
Figure 3B:
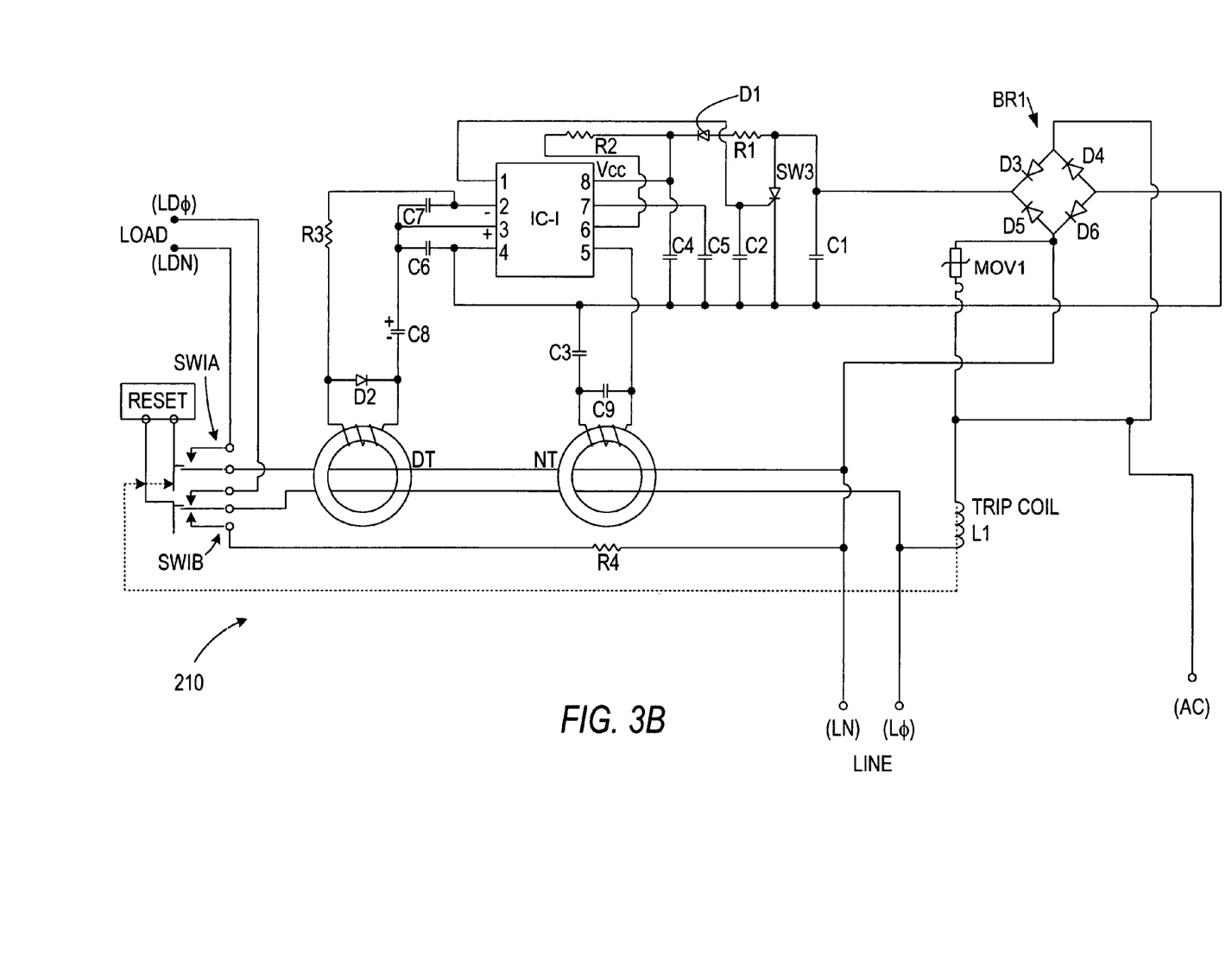

FIG. 3A shows a schematic diagram of the current detection circuit 212 of FIG. 2 for providing overcurrent protection. FIG. 3B shows a schematic diagram of the GFCI circuit 210 for providing fault protection. Referring to FIG. 3A, the DC power supply circuit 206 derives AC power from the GFCI circuit 210 using a resistor R4 connected to an alternating current (AC) terminal of circuit 210 (FIG. 3B). Power supply circuit 206 obtains power from terminal AC so that it can benefit from the surge protection circuitry built into circuit 210. Power supply circuit 206 includes diode D9, zener diode D10 and capacitor C11 for rectifying, regulating and filtering the AC power from circuit 210 to produce positive supply voltage (+V). In a similar manner, diode D7, zener diode D8 and capacitor C10 rectify, regulate and filter the AC power from circuit 210 to produce negative supply voltage (−V). Positive voltage (+V) is divided by a divider network comprising resistor R12 and variable resistor R5 to produce positive reference voltage (+Vref) for the negative input (−) of comparator U1. In a similar manner, negative voltage (−V) is divided by a divider network comprising resistor R6 and variable resistor R8 to produce negative reference voltage (−Vref) for the positive input (+) of comparator U2. It should be noted that all the reference voltages including (+V), (−V), (+Vref) and (−Vref) are referenced with respect to line neutral terminal LN.

Load neutral terminal LDN is connected to the positive input (+) of the comparator U1 and to the negative input (−) of the comparator U2 through resistor R7. Resistor R7 provides adequate impedance for diodes D 1 and D12 to limit the voltage input to protect comparators U1 and U2. Comparators U1 and U2 monitor the voltage drop developed across the neutral conductor or wire (line neutral terminal LN and load neutral terminal LDN) of GFCI circuit 210 and produce a positive output signal when the voltage drop exceeds preset threshold values (+Vref) or (−Vref). The voltage drop across the neutral wire is directly related to the current through the wire and the resistance of the wire. For example, a GFCI device may use approximately 1.5 inches of #16 AWG wire for the neutral terminal resulting in a wire resistance of approximately 0.5 milliohms based on a wire having a resistance of 4 ohms/1000 ft for a length of 1.5 inches. The voltage drop is approximately 2A/mV which is within the range of a typical differential amplifier such as comparators U1 and U2.

The function of comparator circuit 204 is equivalent to a sensing current. Comparator U1 senses a voltage drop for the positive half of the AC cycle and comparator U2 senses a voltage drop for the negative half of the AC cycle. Diodes D13 and D14 combine the outputs of comparators U1 and U2 so that both positive and negative currents are monitored. Resistors R9, R10 and capacitor C12 form an integrator circuit to filter inrush current and other transients so to prevent false tripping of GFCI circuit 210 (FIG. 3B). Switch SW2 has a gate terminal connected to the output of the comparators U1, U2, a cathode terminal connected to the line neutral terminal LN, and an anode terminal connected to the load phase terminal LDø. When the output of the integrator exceeds a preset threshold, switch SW2 is turned on providing a current flow between line neutral terminal LN and load phase terminal LDø simulating a ground fault condition and causing GFCI 210 to trip. The output of switch SW2 is connected to the load phase terminal LDø through resistor R11 which limits the current through the switch. Switch SW2 is shown as a silicon controlled rectifier (SCR) but any transistor, semiconductor controlled switch, or mechanical switch can be employed. Exemplary values for current detector circuit 212 illustrated in FIG. 3A are as follows: each diode D7, D9, D11, D12, D13 and D14 is IN4004; each Zener diode D8, D10 is IN4747; each resistor R4, R6, R7 and R12 is 36,000 ohms, ½ W; resistor R5 and R8 are 500 ohms; and resistor R11 is 33,000 ohms. Comparators U1, U2 can be one of the integrated circuits used for performing a comparison function (e.g., LM-324) manufactured by National Semiconductor or other well known semiconductor manufacturers.

Referring to FIG. 3B, the GFCI circuit 210, in addition to being triggered by an overcurrent condition as explained above, is capable of being triggered by a predetermined condition such as ground fault condition (current imbalance through the line terminals). The GFCI circuit 210 is based on GFCI circuitry such as that disclosed in commonly owned U.S. Pat. No. 6,734,769 which is incorporated herein in its entirety by reference. The GFCI circuit 210 includes a sensing circuit comprising a differential (DT) transformer, a Ground/Neutral transformer (NT), an integrated circuit (IC-1) for detecting current and outputting a voltage once it detects a current, a full wave bridge rectifier BR1 (comprising diodes D3, D4, D5, and D6), a surge suppressor MOV1 for absorbing extreme electrical energy levels that may be present at the line terminals, various filtering coupling capacitors (C1-C9), a gated semiconductor device SW3, a relay (trip) coil assembly (L1), various current limiting resistors (R1-R4), a voltage limiting zener diode (D2), a diode D1 for providing a power supply voltage and a pair of switches SW1A, SW1B for providing a conductive path between the line and load terminals.

In one embodiment, the relay L1 can be implemented using bobbin, a coil and plunger components (not shown). In addition, the NT transformer is able to detect a remote ground voltage that may be present on one of the load terminal conductors and provide a current to IC-1 upon detection of this remote ground which again activates relay L1. Also, the GFCI circuit 210 allows the GFCI device to be reset using, for example, a user accessible Reset button. In addition, the GFCI circuit 210 can include a reset lockout mechanism to prevent the resetting of the GFCI if certain components are not operating properly.

In operation, when a predetermined condition occurs, such as a ground fault, there is a difference in current amplitude between the two line terminals LN, Lø. This current difference is manifested as a net current which is detected by the differential transformer DT and is provided to IC-1. Integrated circuit IC-1 can be one of integrated circuits typically used in ground fault circuits (e.g., LM-1851) manufactured by National Semiconductor or other well known semiconductor manufacturers. In response to the current provided by the differential transformer DT, integrated circuit IC-1 generates a voltage on pin 1 which is connected to the gate of switch SW3. Switch SW3 is turned on activating relay L1 and causing switches SW1A, SW1B to open thereby disconnecting the line terminals from the load terminals.

In an overcurrent condition, the GFCI circuit 210 can be tripped by the current detection circuit 212. For example, when the circuit 212 detects an overcurrent condition it closes the switch SW2 in response thereto. The closure of switch SW2 simulates a ground fault condition in the GFCI circuit 210 thereby causing the circuit 210 to trip. Thus, the current detection (sensing) circuit 212 engages the circuit interrupting portion of the GFCI circuit 210 causing it to be tripped. In the tripped condition the line terminals are isolated from the load terminals. Thus, the present invention provides a GFCI device 200 with both ground fault and overcurrent protection.

Figure 4:
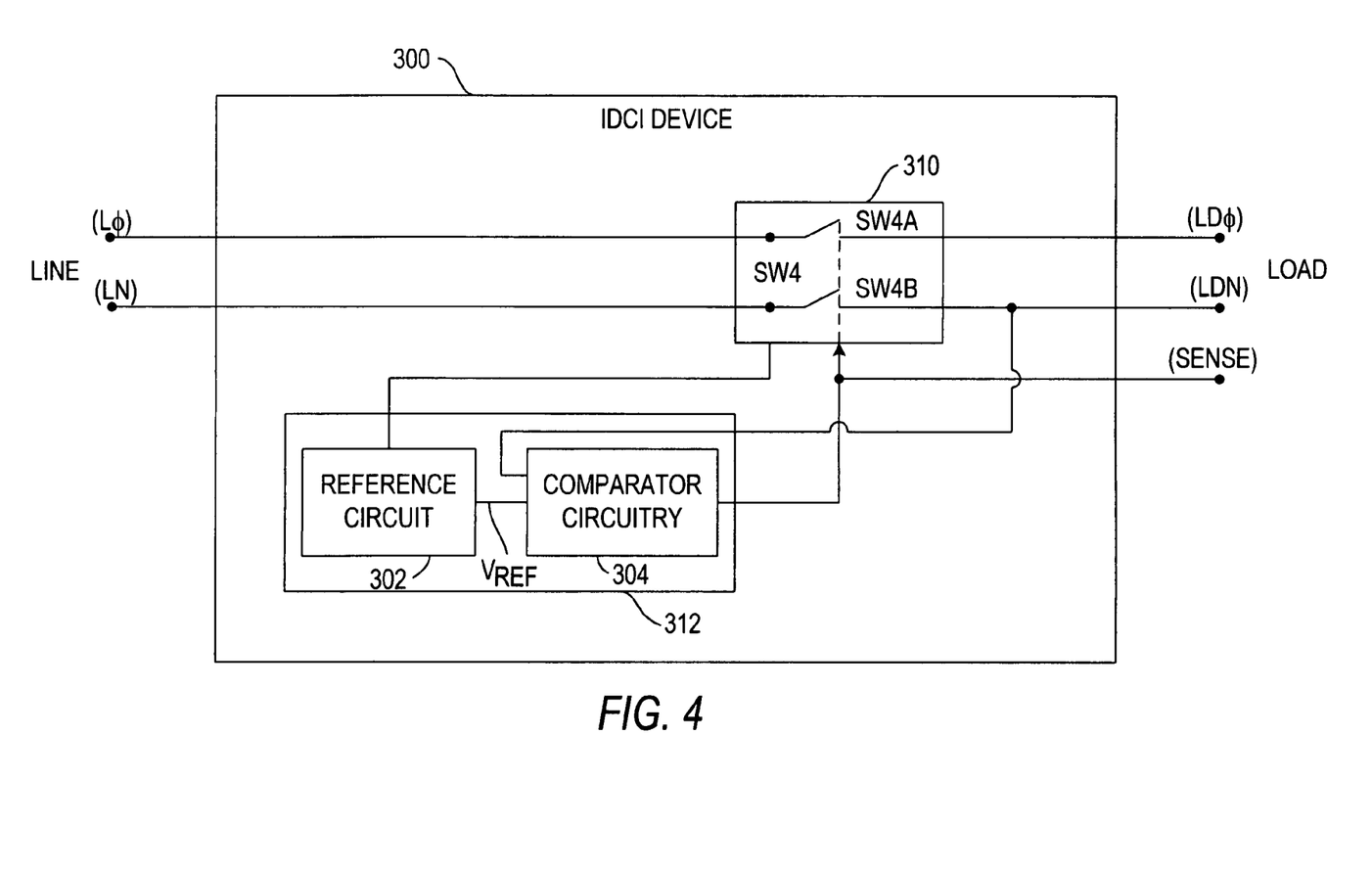
FIG. 4 is a block diagram of an immersion detection circuit interrupter (IDCI) device with an IDCI circuit and current detection circuit providing overcurrent protection according to an embodiment of the present invention.

FIG. 4 is a block diagram of an immersion detection circuit interrupter (IDCI) device 300 comprising an IDCI circuit 310 for providing immersion detection and a current detection circuit 312 for providing overcurrent protection. The IDCI circuit 310 includes a first switch SW4A to provide a conductive path between the line side phase terminal Lø and the load side phase terminal LDø of the device and a second switch SW4B to provide a conductive path between line side neutral terminal LN and the load side neutral terminal LDN of the device. A sense terminal, for example a sense shield or wire, is connected between the circuit 310 and a load for sensing an immersion condition at the load. The circuit 310 responds to such a condition by causing the switches SW4A, SW4B to break the conductive path thereby disconnecting the load side from the line side and placing the device in the tripped state.

The current detection circuit 312 is responsible for detecting an overcurrent condition and causing the IDCI circuit 310 to break the conductive path in response thereto. The current detection circuit 310 includes a comparator circuit 304 that compares a predefined threshold voltage Vref to a voltage based on a current through the load neutral LDN terminal and line neutral terminal LN of IDCI circuit 310. The reference circuit 302 provides reference voltage Vref based on an AC voltage derived from line phase terminal Lø of GFCI circuit 310.

In operation, under normal conditions (non-overcurrent and non-immersion condition), switches SW4A, SW4B are closed providing a path between line and load terminals. In an overcurrent condition, comparator 304 determines whether the predefined voltage Vref has been exceeded because of the overcurrent condition. If the predefined voltage Vref has been exceeded, the comparator generates an output signal directed to IDCI circuit 310 to cause switches SW4A, SW4B to open. Thus, the current detection circuit 312 detects an overcurrent condition and causes the removal of power from load phase terminal LDø and load neutral terminal LDN. In addition, as explained below, IDCI circuit 310 also provides immersion protection through the sense terminal. Thus, the IDCI device 300 provides both immersion and overcurrent protection.

Figure 5A:
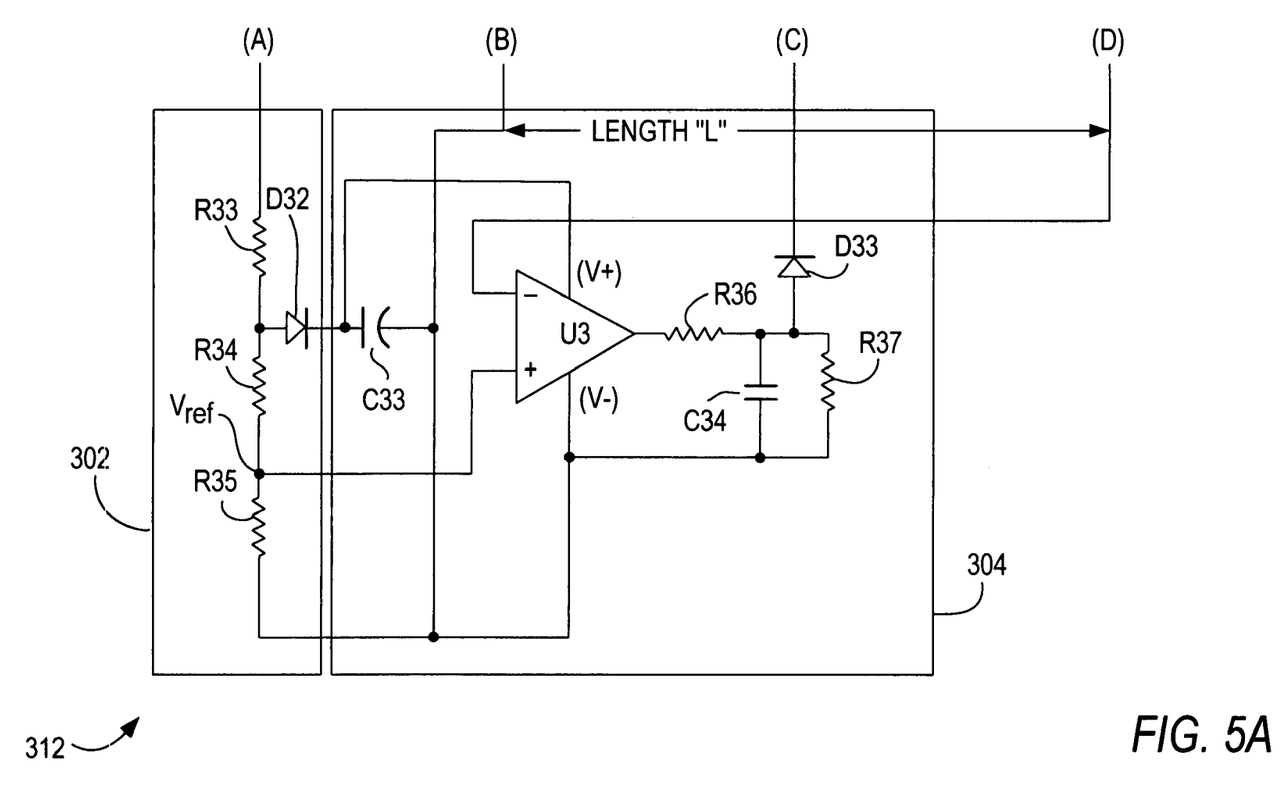
FIGS. 5A and 5B are schematic diagrams, which when placed together, represent a schematic diagram of FIG. 4.
Figure 5B:
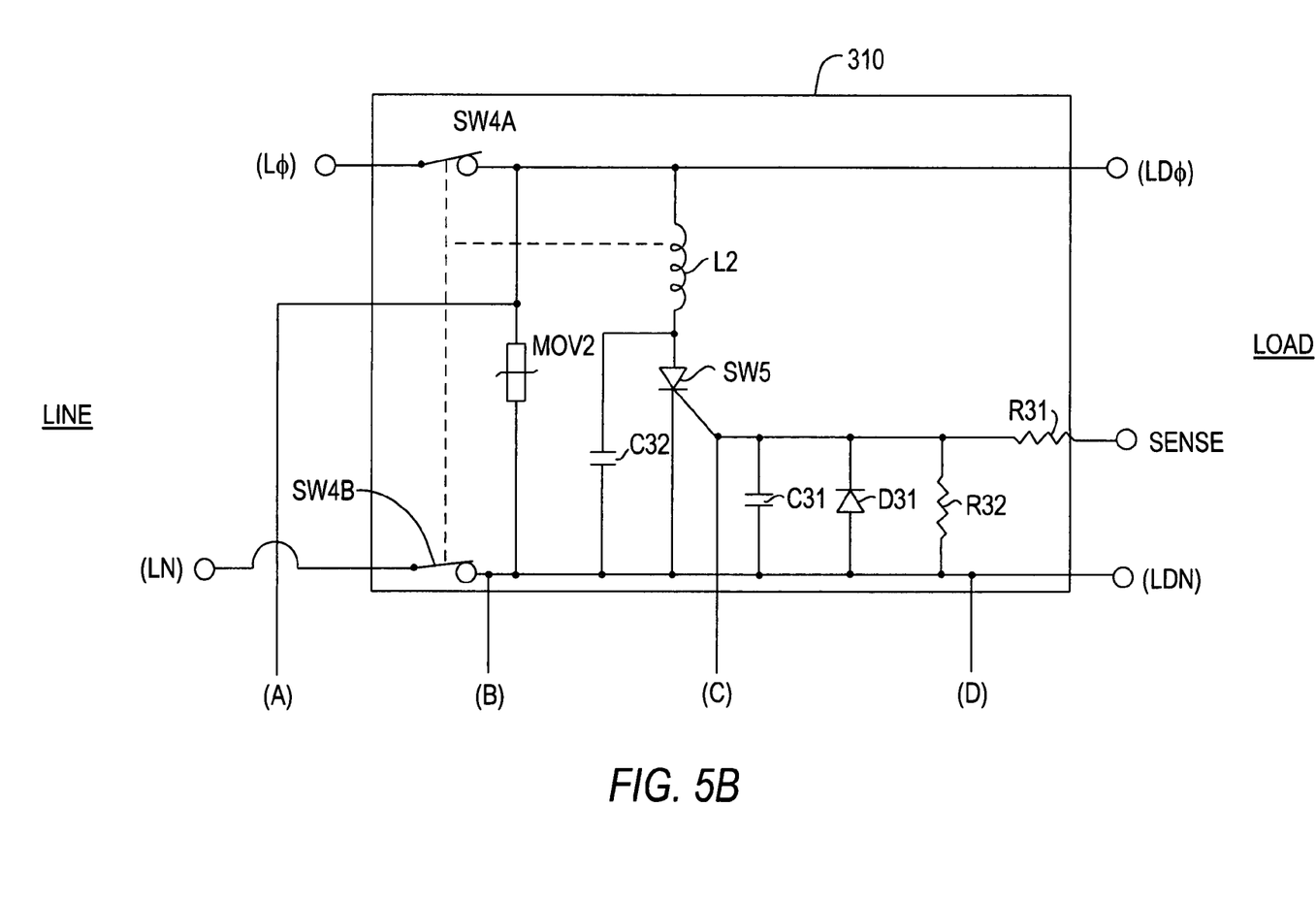

FIG. 5A is a detailed schematic diagram of the current detection circuit 312 of FIG. 4. FIG. 5B is a detailed schematic diagram of the IDCI circuit 310 of FIG. 4. It should be noted that connection points A through D are used for showing the connection between the IDCI circuit 310 and the current detection circuit 312. Referring to FIG. 5A, the current detection circuit 312 includes reference circuit 302 that receives an AC voltage (from the load side neutral terminal LDø at connection point A) and provides a reference voltage Vref (or setpoint) using divider network comprising resistors R33, R34 and R35. Comparator circuit 304 includes a comparator U3 having a positive input (+) connected to reference voltage Vref and a negative input (−) connected to the load neutral terminal LDN at connection point D. Comparator U3 can be any one of integrated circuits used for performing a comparison function (e.g., LM-324) manufactured by National Semiconductor or other well known semiconductor manufacturers. The positive power supply terminal (V+) of comparator U1 is connected to reference voltage Vref through diode D32 and resistor R34. The negative power supply terminal (V−) of comparator U3 is connected to the load neutral terminal LDN at connection point B. Capacitor C33 is connected across positive power supply terminal (V+) and negative supply terminal (V−) of comparator U3 for providing filtering functionality to comparator U3. The output of comparator U3 is connected to the gate of switch SW5 (FIG. 5B) at connection point C through resistor R36 and diode D33. The comparator U3 provides an output signal to connection point C when the voltage Vref has been exceeded by voltage drop developed across Length L between points B and D of the neutral terminal. The voltage drop is caused by the flow of current across the length L because of an overcurrent condition. A typical value for voltage Vref is in the milli-volt range. Resistors R36, R37 and capacitor C34 form an output integration circuit to handle an inrush current condition. A value for voltage Vref is determined by first calculating the impedance Z of a portion of a neutral wire having a length L. Next, the desired overcurrent trip level is chosen and multiplied by impedance Z resulting in reference Vref. Once reference Vref has been selected, values for resistors R33, R34 and R35 are chosen to support the desired reference voltage Vref.

Referring to FIG. 5B, shown is a schematic diagram of IDCI circuit 310 which, in addition to being triggered in response to an overcurrent condition, is capable of providing immersion detection and prevention through the Sense terminal. The IDCI circuit 310 is similar to IDCI circuitry disclosed in commonly owned U.S. Pat. No. 6,693,779 which is incorporated herein in its entirety by reference. One end of the Sense terminal is connected to a sense circuit comprising resistors R31, R32, capacitor C31, and diode D31. The other end of the Sense terminal is disposed in an electrical appliance, such as a hair dryer, which may be exposed to a wet environment. A surge suppressor MOV provides protection against input surges at the line terminals and capacitor C2 provides filtering functionality for coil L2. Switch SW5 has a gate terminal connected to the sense terminal through resistor R31, a cathode terminal connected to the load neutral terminal and an anode terminal connected to the load phase terminal through the coil L31. SW5 is shown as an SCR but any other electronically or electro-mechanically controlled switch can be used. Switches SW4A, SW4B are used to provide a conductive path between the line and load terminals. In one embodiment, switches SW4A and SW4B comprise a single pole double throw (SPDT) switch but other configurations are possible.

In operation, under normal conditions (non-overcurrent and non-immersion condition), switches SW4A, SW4B are closed providing a path between line and load terminals and switch SW5 is open. In an overcurrent condition, comparator U3 determines whether the predefined voltage Vref has been exceeded and generates an output signal to cause switch SW5 to conduct. The conduction of switch SW5 causes current to flow through coil L31 thereby opening switches SW4A, SW4B and breaking the electrical conductive path between the line and load side. In an immersion condition, if the electrical appliance is exposed to a wet environment, an electrical signal is sent from the appliance over the Sense terminal. The signal is received by the switch SW5 (gate of SCR) causing coil L2 to fire as a result of the immersion condition. The firing of the coil L2 causes switches SW4A, SW4B to open breaking the electrical conductive path between the line and load side. Thus, the present invention provides an IDCI device 300 with both immersion and overcurrent protection.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. A fault circuit interrupter device having a current detection circuit for providing an overcurrent protection, where the current detection circuit comprises:
   at least one input conductor;
   at least one output conductor;
   a switch coupled across a neutral terminal and a phase terminal of the device, said switch configured to cause an imbalance; and
   a comparator electrically connected to said switch via said at least one input conductor and said at least one output conductor; and
   wherein said comparator is an overcurrent comparator coupled at a first end to a first section on a neutral line, and is coupled at a second end to a second section on said neutral line to read a voltage drop across a continuous line segment, wherein when a current flowing through said continuous line segment of said circuit interrupter is greater than a predetermined magnitude, along said netural line said comparator is disposed to cause said switch to close causing said switch to conduct, creating a current imbalance causing the device to be tripped.

2. The device of claim 1 further comprising a direct current (DC) power supply derived from the device for powering the comparator.

3. The device of claim 1 where the switch is a silicon controlled rectifier (SCR).

4. The device of claim 1 wherein said comparator includes a first comparator for comparing a positive portion of the sensed voltage and a second comparator for comparing a negative portion of the sensed voltage.

5. The device of claim 1 further comprising an integrator circuit coupled between the output of the comparator and the input of the switch.

6. An arc fault circuit interrupter (AFCI) device having a current detection circuit for providing an overcurrent protection, the current detection circuit comprising:
   at least one input conductor;
   at least one output conductor;
   a switch coupled across a line side neutral terminal and a load side phase terminal of the device, said switch configured to cause an imbalance; and
   a comparator electrically connected to the switch via said at least one input conductor and said at least one output conductor; and
   wherein said comparator is an over-current comparator coupled along a neutral line to read a voltage drop across said neutral line, wherein when the current flowing through a neutral continuous line segment of said circuit interrupter is greater than a predetermined magnitude, along said neutral line said comparator is disposed to cause said switch to close causing said switch to conduct, creating a current imbalance causing the device to be tripped.

7. An immersion detection circuit interrupter (IDCI) device having a current detection circuit for providing an overcurrent protection, the current detection circuit comprising:
   at least one input conductor;
   at least one output conductor;
   a switch coupled across a line side neutral terminal and a load side phase terminal of the device, said switch configured to cause an imbalance; and
   a comparator electrically connected to the switch via said at least one input conductor and said at least one output conductor;
   wherein said comparator is an overcurrent comparator coupled along a neutral line to read a voltage drop across a neutral line segment, wherein when the current flowing through said neutral line segment of said circuit interrupter is greater than a predetermined magnitude, along saud neutral line said comparator is disposed to cause said switch to close causing said switch to conducts, creating a current imbalance causing the device to be tripped.

8. A ground fault circuit interrupting (GFCI) device comprising:
   line side phase and neutral terminals for connection to a power source;
   load side phase and neutral terminals for connection to a load; and
   a current detection circuit coupled to the GFCI device for providing overcurrent protection, the current detection circuit comprising:
      at least one input conductor;
      at least one output conductor;
      a switch coupled across a line side neutral terminal and a load side phase terminal of the device, said switch configured to cause an imbalance; and
      a comparator electrically connected to the switch;
   wherein said comparator is an overcurrent comparator coupled along a neutral line, to read a voltage drop across said neutral line, wherein when the current flowing through a neutral continuous line segment of said circuit interrupter is greater than a predetermined magnitude along said neutral line, said comparator is disposed to cause said switch to close, causing said switch to conduct creating a current imbalance causing the device to be tripped.

9. The device of claim 8 further comprising a direct current (DC) power supply derived from the device for powering the comparator.

10. The device of claim 8 wherein a predetermined current threshold is determined by a predefined threshold voltage which is based on a voltage from a direct current (DC) power supply derived from the device.

11. The device of claim 8 where the switch is a silicon controlled rectifier (SCR).

12. The device of claim 8 where the comparator includes a first comparator for comparing a positive portion of the sensed voltage and a second comparator for comparing a negative portion of the sensed voltage.

13. The device of claim 8 further comprising an integrator circuit coupled between the output of the comparator and the input of the switch.

14. An arc fault circuit interrupter (AFCI) device comprising:
   line phase and neutral terminals for connection to a power source;
   load phase and neutral terminals for connection to a load; and
   a current detection circuit coupled to the AFCI device for providing overcurrent protection, the current detection circuit comprising:
      at least one input conductor;
      at least one output conductor;
      a switch coupled across a line side neutral terminal and a load side phase terminal of the device, said switch configured to cause an imbalance; and
      a comparator electrically connected to the switch;
   wherein said comparator is an overcurrent comparator coupled along said neutral to read a voltage drop across a neutral line, wherein when the current flowing through a neutral line segment of said circuit interrupter is greater than a predetermined magnitude along said neutral line, said comparator is disposed to cause said switch to close, causing said switch to conduct creating a current imbalance causing the device to be tripped.

15. An immersion detection circuit interrupter (IDCI) device comprising:
   line phase and neutral terminals for connection to a power source;
   load phase and neutral terminals for connection to a load; and
   a current detection circuit coupled to the IDCI device for providing overcurrent protection, the current detection circuit comprising:
   at least one input conductor;
      at least one output conductor;
      a switch coupled across a line side neutral terminal and a load side phase terminal of the device, said switch configured to cause an imbalance; and
      a comparator electrically connected to the switch;
   wherein said comparator is an overcurrent comparator coupled along a said neutral line to read a voltage drop across said neutral line wherein said over-current comparator measures a current flowing through a neutral line segment, wherein when said measured current in the circuit is greater than a predetermined magnitude along said neutral line, said current comparator causes said switch to close causing the switch to conduct creating a current imbalance causing the device to be tripped.

16. An immersion detection circuit interrupter (IDCI) device comprising:
- line phase and neutral terminals for connection to a power source;
- load phase and neutral terminals for connection to a load; and
- a switch coupled across a line side neutral terminal and a load side phase terminal of the device said switch configured to cause an imbalance
- a current detection circuit coupled to the IDO1 device for providing overcurrent protection comprising:
- an over-current comparator coupled along a neutral line, wherein said overcurrent comparator determines an overcurrent condition by comparing a predefined threshold voltage to a sensed voltage along a continuous section on said neutral line based on a current through said neutral line of the IDCI device, and based on the results of the comparison, the comparator causes the IDCI device to be tripped.

17. The device of claim 16 where the predefined voltage is based on a current through the line and load terminals and an impedance of a length of a wire comprising the line and load neutral terminals.

18. The device of claim 16 further comprising a direct current (DC) power supply derived from the device for powering the comparator.

19. The device of claim 16 where the predefined threshold voltage is based on a voltage from a direct current (DC) power supply derived from the device.

20. A process for determining an overcurrent condition in a fault circuit comprising the following steps:
- setting a predefined reference voltage;
- determining a default resistance in a continuous neutral line coupled to a comparator;
- determining a voltage drop across said continuous neutral line;
- comparing said voltage drop across said continuous line to said reference voltage by comparing a voltage drop from a current flowing along a neutral line;
- closing a switch to create a current imbalance in the circuit interrupter if said voltage drop exceeds said reference by determining that said voltage drop across said neutral line exceeds a predetermined reference voltage; and
- activating said fault circuit in response to said current imbalance.

21. A circuit interrupter device having a current detection circuit for providing an overcurrent protection, where the current detection circuit comprises:
- at least one input conductor;
- at least one output conductor;
- a switch coupled across a line side neutral terminal and a load side terminal of the device, said switch configured to cause an imbalance; and
- a comparator electrically connected to said switch via said at least one input conductor and said at least one output conductor by comparing a voltage drop from a current flowing between a load neutral terminal and a line side neutral terminal; and
- wherein said comparator is an overcurrent comparator coupled at a first end to a first section on a line, and is coupled at a second end to a second section on a line to read a voltage drop across a continuous line segment, wherein when a current flowing through said continuous line segment of said circuit interrupter is greater than a predetermined magnitude, said comparator is disposed to cause said switch to close causing said switch to conduct, creating a current imbalance causing the device to be tripped.

* * * * *

UNITED STATES PATENT AND TRADEMARK OFFICE
CERTIFICATE OF CORRECTION

PATENT NO.        : 7,639,461 B2
APPLICATION NO.   : 11/109628
DATED             : December 29, 2009
INVENTOR(S)       : Di Salvo et al.

It is certified that error appears in the above-identified patent and that said Letters Patent is hereby corrected as shown below:

In particular, in Column 11, line 10 (Line 10 of Claim 16), after the word "the", please change "IDO1" to correctly read: --IDCI--.

Signed and Sealed this

Twenty-first Day of September, 2010

David J. Kappos
*Director of the United States Patent and Trademark Office*